United States Patent
Sarwar et al.

(10) Patent No.: US 10,686,626 B2
(45) Date of Patent: Jun. 16, 2020

(54) INTELLIGENT GATEWAY CONFIGURATION FOR INTERNET-OF-THINGS NETWORKS

(71) Applicant: Intel Corporation, Santa Clara, CA (US)

(72) Inventors: Usman Sarwar, Penang (MY); Anil Kumar, Chandler, AZ (US); Lee Booi Lim, Batu Maung (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/300,503

(22) PCT Filed: Jul. 8, 2016

(86) PCT No.: PCT/US2016/041418
§ 371 (c)(1),
(2) Date: Nov. 9, 2018

(87) PCT Pub. No.: WO2018/009205
PCT Pub. Date: Jan. 11, 2018

(65) Prior Publication Data
US 2019/0149361 A1    May 16, 2019

(51) Int. Cl.
*H04L 12/66* (2006.01)
*H04L 29/08* (2006.01)
*H04L 12/24* (2006.01)

(52) U.S. Cl.
CPC .............. *H04L 12/66* (2013.01); *H04L 29/08* (2013.01); *H04L 41/08* (2013.01); *H04L 41/0806* (2013.01); *H04L 41/0886* (2013.01); *H04L 67/125* (2013.01); *H04L 67/34* (2013.01)

(58) Field of Classification Search
None
See application file for complete search history.

(56) References Cited

U.S. PATENT DOCUMENTS

| | | |
|---|---|---|
| 2007/0005766 A1 | 1/2007 | Singhal et al. |
| 2008/0159139 A1 | 7/2008 | Smith et al. |
| 2013/0212212 A1 | 8/2013 | Addepalli et al. |

(Continued)

FOREIGN PATENT DOCUMENTS

KR    20160009618 A    1/2016

OTHER PUBLICATIONS

International Search Report for PCT/US2016/041418 dated Apr. 4, 2017, 3 pages.

(Continued)

*Primary Examiner* — Yaotang Wang
(74) *Attorney, Agent, or Firm* — Alliance IP, LLC

(57) ABSTRACT

In one embodiment, an apparatus comprises a processor, wherein the processor is configured to: detect deployment context information for an edge gateway, wherein the deployment context information identifies a deployment environment of the edge gateway based on information from one or more sensors; transmit, via a communications network, the deployment context information for the edge gateway to a gateway management node; receive, via the communications network, a gateway configuration for the edge gateway from the gateway management node; and configure the edge gateway based on the gateway configuration.

19 Claims, 7 Drawing Sheets

(56) References Cited

U.S. PATENT DOCUMENTS

2014/0192717 A1    7/2014  Liu et al.
2016/0050264 A1*  2/2016  Breed .................... H04L 67/12
                                                               709/217
2017/0230340 A1*  8/2017  Chou ...................... H04W 4/70

OTHER PUBLICATIONS

Written Opinion of the International Searching Authority for PCT/US2016/041418 dated Apr. 4, 2017, 8 pages.
International Preliminary Report on Patentability for Application No. PCT/USZ016/041418, dated Jan. 8, 2019, 10 pages.

* cited by examiner

INTELLIGENT GATEWAY CONFIGURATION FOR INTERNET-OF-THINGS NETWORKS

CROSS-REFERENCE TO RELATED APPLICATIONS

This application is a national stage application under 35 U.S.C. § 371 of PCT International Application Serial No. PCT/US2016/041418, filed on Jul. 8, 2016, and entitled INTELLIGENT GATEWAY CONFIGURATION FOR INTERNET-OF-THINGS NETWORKS. The disclosure of the prior application is considered part of and is hereby incorporated by reference in its entirety in the disclosure of this application.

TECHNICAL FIELD

This disclosure relates in general to the field of computer systems and, more particularly, to intelligent gateway configuration for Internet-of-Things networks.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, and watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow a new era of advanced automation and interconnectivity, referred to, sometimes, as the Internet-of-Things (IoT).

DETAILED DESCRIPTION OF EXAMPLE EMBODIMENTS

Figure 1:
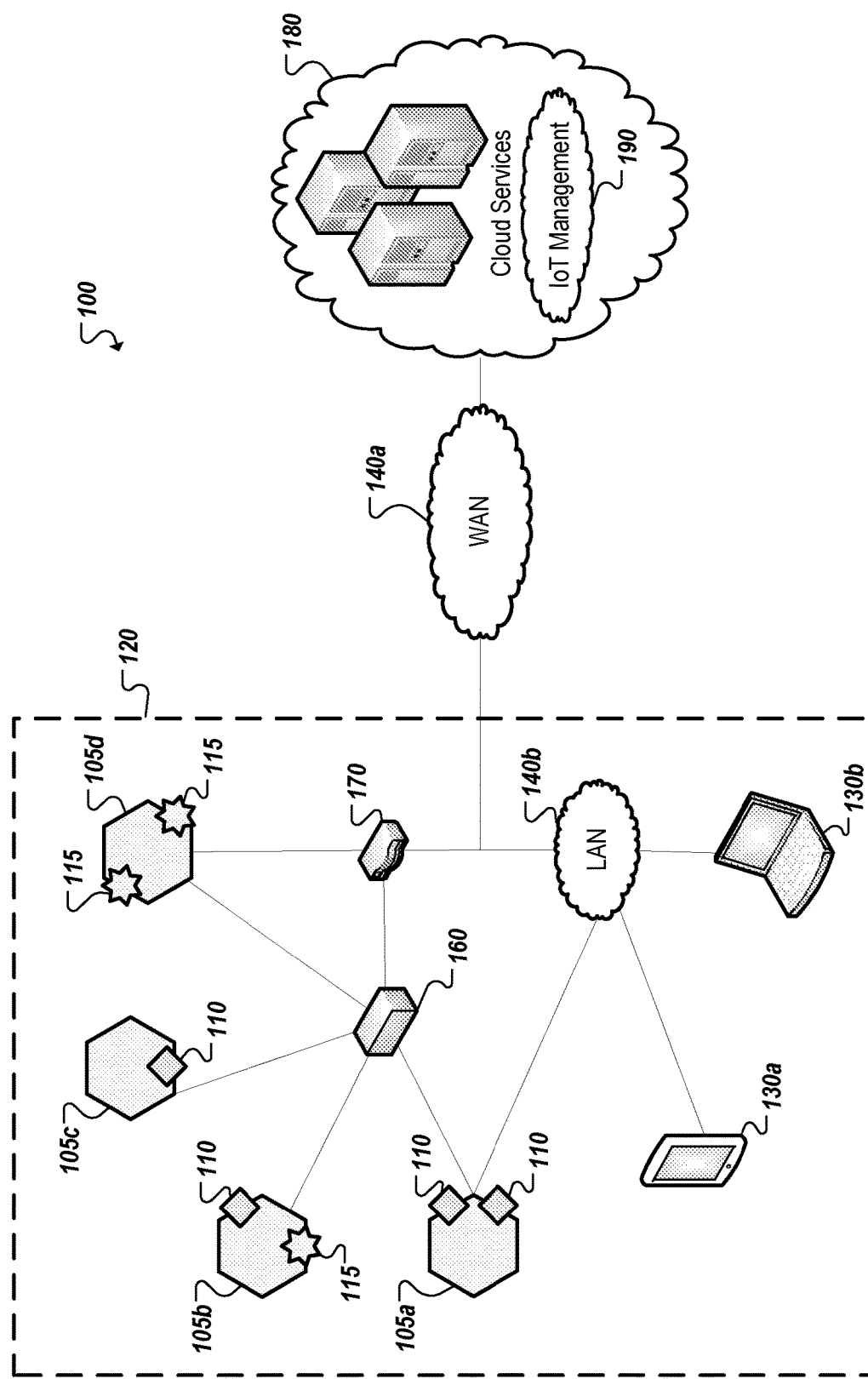
FIG. 1 illustrates an example embodiment of a communications system.

FIG. 1 illustrates an example embodiment of a communications system 100. Communications system 100 includes edge devices 120, networks 140, and cloud services 180. Edge devices 120 include a variety of devices deployed at the "edge" of the communications system 100, including sensor and/or actuator devices 105, end-user devices 130 (e.g., mobile devices, laptops), resource brokers 160, and gateways 170. Edge devices 120 may communicate with other remote networks and/or services (e.g., cloud services 180) through a back-haul network, such as Wide Area Network (WAN) 140a (e.g., the Internet).

Sensor/actuator devices 105 of edge devices 120 may include one or more types of sensors (e.g., 110) and/or actuators (e.g., 115), along with other resources such as processors, storage, power, and/or communications functionality, which can be leveraged and utilized within a machine-to-machine (M2M) or Internet-of-Things (IoT) communications system 100. For example, sensor/actuator devices 105 may include a computer processor and/or communications interface to allow interoperation with other edge devices 120 (e.g., end-user devices 130, broker 160, and/or gateway 170) or network services (e.g., cloud services 180, IoT management service 190).

Sensors 110 of each device 105 may include internal sensors and/or external sensors. Internal sensors 110, for example, may be configured to sense or monitor contextual information regarding a device's 105 own internal operating environment, such as processor usage, device workload, memory capacity, battery capacity, network usage, internal temperature (e.g., heating of processors), software security alerts, software errors and exceptions, among other attributes and events. External sensors 110, for example, may be configured to detect, measure, and generate sensor data describing characteristics and contextual information of the device's 105 external operating environment where it resides. For instance, a given sensor 110 may be configured to detect contextual information of a device 105, such as movement, weight, physical contact, temperature, wind, noise, light, computer communications, wireless signals, location, humidity, the presence of radiation, liquid, or specific chemical compounds, among several other examples. Indeed, device sensors 110 as described herein contemplate a potentially limitless universe of various sensors, each designed to detect and generate corresponding sensor data for new and unknown operating environment characteristics.

Actuators 115 of each device 105 are components configured to perform a particular action that impacts a device's environment. For instance, devices (e.g., 105b, d) may include actuators 115 that accept an input and perform a respective action in response. Actuators can include controllers to activate additional functionality, such as an actuator to selectively toggle the power or operation of an alarm, camera (or other sensors), heating-ventilation-air conditioning (HVAC) appliance, household appliance, in-vehicle device, and/or lighting, among other examples.

As noted above, sensors 110 and actuators 115 of devices 105 can be incorporated into an Internet-of-Things (IoT) and/or machine-to-machine (M2M) system. IoT or M2M systems (which may be used interchangeably herein) may refer to new or improved ad-hoc systems and networks composed of multiple different devices operating synergistically to deliver one or more results, services, or deliverables. Such ad-hoc systems are emerging as more and more products and equipment evolve to become "smart," meaning that they are controlled and/or monitored by computing processors and provided with facilities to communicate, through computer-implemented mechanisms, with other computing devices (and products having network communication capabilities). For instance, IoT systems may include networks built from sensors and communication modules integrated in, or attached to, "things" such as equipment, toys, tools, vehicles, etc., and even living things (e.g., plants, animals, humans). Sensor and/or actuator devices 105 may be "greenfield" devices developed with IoT capabilities from the ground-up, or "brownfield" devices created by integrating IoT capabilities into existing legacy devices that were initially developed without IoT capabilities. In some instances, an IoT system can develop organically or unexpectedly, with a collection of sensors monitoring a variety of contextual attributes of their operating environments, which are then interconnected with data analytics systems and/or systems controlling one or more other smart devices to enable various novel use-cases and applications. Further, IoT systems can be formed from devices that originally had no relationship or communication with each other, where the system is automatically configured spontaneously or on the fly (e.g., in accordance with an IoT application defining or controlling the interactions). Further, IoT systems can often be composed of complex and diverse collections of connected devices (e.g., edge devices 120), such as devices sourced or controlled by varied groups of entities and employing varied hardware, operating systems, software applications, and technologies.

Facilitating the successful interoperability of such diverse systems is, among other example considerations, an important issue when building or defining an IoT system. Software applications can be developed to govern how a collection of IoT devices can interact to achieve a particular goal or service. In some cases, the IoT devices may not have been originally built or intended to participate in such a service or in cooperation with one or more other types of IoT devices. Indeed, part of the promise of the Internet-of-Things is that innovators in many fields will dream up new applications involving diverse groupings of IoT devices as such devices become more commonplace, and as new "smart" or "connected" devices emerge.

As shown in the example of FIG. 1, an IoT system 100 can include a variety of IoT edge devices 120, including sensor/actuator devices 105, end-user devices 130, resource brokers 160, and/or gateways 170, among other examples. For instance, an IoT device 120 can include such examples as a mobile personal computing device (e.g., 130*a*), such as a smart phone or tablet device, a wearable computing device (e.g., a smart watch, smart garment, smart glasses, smart helmet, headset, etc.), less conventional computer-enhanced products such as home, building, and vehicle automation devices (e.g., smart heat-ventilation-air-conditioning (HVAC) controllers and sensors, light detection and controls, and energy management tools), smart appliances (e.g., smart televisions, smart refrigerators), among other examples. Some devices can be purposefully built to host sensor and/or actuator resources (i.e., "greenfield" devices), such as weather sensor devices that include multiple sensors related to weather monitoring (e.g., temperature, wind, humidity sensors, etc.), traffic sensors and controllers, among many other examples. Some devices may be statically located, such as a device mounted within a building, on a lamppost, sign, water tower, secured to a floor (e.g., indoor or outdoor), or other fixed or static structure. Other devices may be mobile, such as a sensor provisioned in the interior or exterior of a vehicle, in-package sensors (e.g., for tracking cargo), wearable devices worn by active humans or animals, and/or an aerial, ground-based, or underwater drone, among other examples. Indeed, it may be desired that some sensors move within an environment and applications can be built around use-cases involving mobile devices, mobile users, and/or changing environments.

Continuing with the example of FIG. 1, IoT management platforms 190 can be provided to allow developers and end users to build and configure IoT applications and systems. An IoT application can provide software support to organize and manage the operation of a set of IoT devices for a particular purpose or use-case. In some cases, an IoT application can be embodied as an application on an operating system of a user computing device (e.g., laptop 130*b*), a mobile application for execution on a smart phone, tablet, smart watch, or other mobile device (e.g., 130*a*), and/or an IoT application on another edge device (e.g., gateway 170). In some cases, an IoT management system 190 can provision one or more deployed devices in an IoT system with the appropriate IoT application(s).

In some cases, an IoT application can make use of a dedicated or general purpose management utility or administrative tool 190 allowing users to configure settings and policies to govern how the set of devices (e.g., IoT edge devices 120) are to operate when deployed in an IoT system. An IoT management utility 190 can also be used to select which devices are used with the application. In other cases, a dedicated IoT management application can be provided which can manage potentially multiple different IoT applications or systems. The IoT management utility 190, or system, may be hosted on a single system, such as a single server system (e.g., 180) or a single device (e.g., 105, 130, 160, 170), or alternatively the IoT management system may be distributed across multiple hosting devices (e.g., 180, 105, 130, 160, 170).

In some cases, IoT systems can interface (through a corresponding IoT management system or application or one or more of the participating IoT devices) with remote services, such as data storage, information services (e.g., media services, weather services), geolocation services, and computational services (e.g., data analytics, search, diagnostics, etc.) hosted in cloud-based and other remote systems (e.g., 180, 190). For instance, the IoT system can connect to a remote service over one or more networks 140. In some cases, the remote service can, itself, be considered an asset of an IoT application and system. Data received by a remotely-hosted service can be consumed by the governing IoT application and/or one or more of the component IoT devices to cause one or more results or actions to be performed, among other examples.

One or more networks 140 may facilitate communication between IoT devices 120 and other remote networks or services, such as cloud services 180 and/or IoT management services 190, to implement and manage IoT applications and devices. Such networks can include wired and/or wireless local networks, public networks, wide area networks, broadband cellular networks, the Internet, and the like. In some implementations, one or more gateway devices 170 can be utilized to facilitate communications with, or between, IoT devices 120 (e.g., sensor/actuator devices 105 and end-user devices 130) within a given IoT system 100. For instance, a gateway 170 can be utilized to extend the geographical reach of an IoT system, to provide a mechanism to communicate with IoT devices that possess limited or proprietary communications capabilities (e.g., sensor/actuator devices 105), or form sub-groups of devices within an IoT system deployment. For example, in some cases, gateways 170 may extend the reach of IoT devices built with short-range communication capabilities (e.g., Bluetooth or ZigBee devices) by providing a front-haul to those devices using their native communications capabilities, and providing a back-haul to the cloud through Wi-Fi, Ethernet, cellular, and/or any other wired or wireless communication medium.

With the growth of IoT devices and systems, there are increasing numbers of smart and connected devices available in the market, such as devices capable of being utilized in home automation, factory automation, smart agriculture, and other IoT applications and systems. For instance, in home automation systems, automation of a home is typically increased as more IoT devices are added for use in sensing and controlling additional aspects of the home. However, as the number and variety of devices increase, the management of "things" (or devices for inclusion in IoT systems) becomes outstandingly complex and challenging.

In addition, IoT systems are generating an unprecedented volume and variety of data. Existing IoT edge devices typically offload this data to the cloud for processing and/or storage. Existing cloud-based services, however, are not equipped for the rapidly growing volume, variety, and velocity of IoT data. Cloud-based services may not be ideal in certain circumstances, for example, when processing time-sensitive data or highly confidential data, or when faced with network bandwidth constraints, among other examples. For example, when time-sensitive data finally makes its way to the cloud for analysis, the opportunity to act on that data may have already passed. "Edge" processing may be leveraged, in some embodiments, to complement the shortcomings of cloud-based processing (e.g., when cloud-based processing is inefficient, ineffective, and/or unsecure), and better handle the ever-growing volume, variety, and velocity of IoT data. Edge processing is an approach that processes certain IoT data at the network edge, near where it was generated, rather than simply funneling large volumes of IoT data to the cloud for processing and storage. Processing IoT data near its source rather than in the cloud may, in some cases, improve performance and avoid system failures or disasters. Edge processing may also conserve network bandwidth, which may be particularly beneficially when facing bandwidth constraints and/or limited network connectivity. Certain data, however, still may be sent to the cloud for historical analysis and long-term storage. Edge processing may be referred to as "fog" computing, as it serves to extend the "cloud" to the edge of a network, creating a "fog" over the network edge. The fog may be considered to be a massively interconnected network wherein a number of IoT devices 120 are in communications with each other, for example, by radio links. This may be performed, in some embodiments, using the open interconnect consortium (OIC) standard specification 1.0 released by the Open Connectivity Foundation™ (OCF) on Dec. 23, 2015. This standard allows devices to discover each other and establish communications for interconnects. Another protocol that may be used in smart-home and similar deployments is Thread, a networking protocol for Internet-of-Things (IoT) "smart" home automation devices, developed by an alliance of organizations named the "Thread Group." Other interconnection protocols may also be used, including, for example, the optimized link state routing (OLSR) Protocol, or the better approach to mobile ad-hoc networking (B.A.T.M.A.N.), among others.

In some embodiments, edge devices 120 may be implemented with cognitive edge processing capabilities to facilitate intelligent network management decisions. Cognitive edge devices 120 may detect and leverage contextual information about their operating environment based on information from sensors 110, other edge devices 120 (e.g., end-user devices 130, brokers 160, gateways 170), cloud services 180, and/or other network resources. This context information for an edge device 120 may be leveraged for various purposes, including cognitive edge processing and service delivery, resource orchestration, and/or intelligent network configuration. Cognitive edge devices 120 may leverage context information, for example, to decide where data should be processed and/or stored (e.g., the cloud or the edge) and by which network entities (e.g., gateways 170, end-user devices 130, the cloud 190). These cognitive decisions could be based, for example, on contextual information about data that needs to be processed (e.g., the type, volume, and/or age of the data), the desired response time, network resource availability and bandwidth constraints, the ability to meet service delivery requirements (e.g., from service level agreements (SLA) or other service delivery specifications), the availability and health of edge devices 120 (e.g., gateways 170, end-user devices 130), the availability and health of cloud services 190, and the physical location of edge devices 120, among other examples. Cognitive edge devices 120 may include any type of edge device, component, and/or node that is enhanced with cognitive and/or context-aware processing capabilities (e.g., local or edge-based data aggregation, processing, and storage capabilities), including gateways 170, brokers 160 (or other orchestration nodes), end-user computing devices 130, sensor/actuator devices 105, local servers, edge servers, and edge (or fog) IoT applications, among other examples. In some embodiments, a cognitive edge device 120 may be formed from multiple interconnected edge devices 120 that effectively operate as a single device. For example, if the contextual information for an edge device 120 indicates that its resources are insufficient, the edge device may be interconnected with one or more additional edge devices, such that the edge device 120 then comprises multiple interconnected edge devices.

Cognitive and/or context-aware edge processing capabilities may also be leveraged, in some embodiments, by resource orchestration brokers 160. For example, a resource broker 160 may provide resource orchestration and workload distribution services for edge devices 120 that are managed by the broker 160. Resource broker 160 may use context information from cognitive edge devices 120 to make intelligent workload distribution decisions that maximize performance and service delivery. Resource broker 160 may be implemented as a standalone edge device, as functionality in an existing edge device, and/or as functionality distributed across multiple edge devices and/or network components. In some embodiments, resource broker 160 may itself be a cognitive edge device 120.

Cognitive and/or context-aware edge processing capabilities may also be leveraged, in some embodiments, to provide intelligent IoT configuration and deployment, including, for example, autonomous gateway 170 configuration. Deployment, configuration, and management of IoT systems may be significantly improved, in some embodiments, through cognitive context-aware edge devices 120 that facilitate autonomous network configuration and management, which significantly reduces the human interaction and labor required in complex and evolving IoT systems. For instance, IoT management and applications can adopt a paradigm where, instead of being programmed and/or configured to operate with specific IoT devices 120 and/or cloud services 180 in static environments and/or use-cases, the system can leverage contextual information about the operating environment of the cognitive IoT devices 120 to autonomously configure and deploy (and re-deploy) an IoT system, and intelligently manage the IoT system, with minimal human intervention. For example, context-aware gateways 170 may configure themselves autonomously based on their use-case and context information about their operating environment, updating that configuration autonomously as their operating environment and/or use-case changes.

In some embodiments, an IoT management system 190 may be used to facilitate autonomous configuration and/or deployment of IoT devices and applications, such as IoT gateways 170. For example, an IoT management system 190 may utilize asset abstraction to simplify the IoT device configuration and deployment process. For instance, users can simply select use-cases, classes, and/or taxonomies of IoT devices 120 and logically assemble a collection of select device classes to build and/or deploy at least a portion of an IoT system or application (e.g., without having to provide details regarding configuration, device identification, data transfer, etc.). In fact, in some cases, the use-case for a particular IoT device or application may be determined automatically based on contextual information from the IoT devices 120, such as a context-aware IoT gateway 170.

In addition to facilitating autonomous and efficient IoT network management, context-aware IoT devices 120 may also improve the resiliency of IoT systems, which may often be expected to provide high levels of reliability and resiliency. Indeed, such characteristics can be critical in some implementations, where even an incremental failure of an IoT system results in costly damage or even potential loss of life. Providing such reliability and resiliency can be challenging in IoT systems, particularly given the dynamic and evolving nature of IoT systems, the number and diversity of devices in IoT systems, and the mobility and continuously changing environments of IoT devices. Particularly in large IoT systems (with more than dozens or hundreds of devices), managing the health and reliability of each device can be prohibitively complex for human managers. Sustained failure of a single device can potentially result in failure of the entire system. Managing a large number of potential points of failure can be daunting. Indeed, given the potential variety of devices (and device manufacturers), some devices can be expected to have higher levels of native resiliency and reliability than others. Further, as many devices may be battery powered, the trustworthiness of the various power sources can also be a factor in how individual devices, and the collective IoT system, perform.

In one implementation, a scalable system management framework for resilient Internet-of-Things (IoT) systems is provided that facilitates the ability of IoT devices 120 (e.g., gateways 170) to dynamically adapt to changes in the system (e.g., battery level change, microprocessor idle time, network topology, device workload change, etc.) and do so in a distributed and cost efficient manner. Further, the system management framework can promote system resiliency at both the system and device level by enabling automated self-healing and self-optimizing of the system. Self-healing can be enabled, for instance, by continuously collecting operating status of individual component devices and causing them to restart or reset when appropriate. Such self-healing actions can take place at the device level. Self-healing can involve the performance of tasks and processes at a device to return the device to its healthy operating state. Further, given that operating status is collected in the background, the framework can utilize machine learning techniques to derive meaning from the data and learn patterns within the system. Models can be developed based on this learning, which can be used to prescribe an action to restart or reconfigure components individually, or redeploy all or a portion of the system as a whole. Reconfiguring can refer to making operational changes to applications/services running on a given device within an IoT system. Redeployment can refer to moving applications/services from the device to other nearby, but compatible devices (e.g., replacing devices in the IoT system with other compatible devices, etc.), or alternatively to a device moving to a new operating environment.

Reliability of an IoT system can refer to the reliability of the system delivering a desired result or outcome in the face of intrinsic influencing factors. System resiliency can refer to the ability of a system to maintain acceptable levels of service despite run-time challenges such as hardware and software failures, communication outages, security threats, or other extrinsic issues. Resilience may contemplate the system maintaining a degraded, but acceptable level of service in some circumstances.

As the scale and dynamics of IoT systems become more difficult to manage, the resilience of IoT systems becomes increasingly important, particularly in implementations seeking to roll out economically viable IoT solutions at scale. Many conventional IoT solutions have proven vulnerable to real world conditions. For instance, the static nature and the unreliable operation of some current IoT technologies in dynamic and challenging operating environments has made some IoT deployments cost prohibitive (thereby discouraging, at some level, future attempts to adopt similar systems, in some cases).

In some embodiments, an improved management framework can be implemented by leveraging telemetry to remotely monitor physical context and conditions of each device (e.g., resource utilization, environmental sensor observations and instruments from the device's sensors and actuators) to ensure the maintenance of a proper working environment for the devices. Such monitoring can make possible self-healing and self-optimizing in some instances. Further, through resource abstraction, devices within a particular use-case, class, or taxonomy, can be treated indifferently in the application and system. Accordingly, in such implementations, IoT devices and applications can be configured, deployed, and redeployed automatically as they are written and stored to specify only resource requirements (by corresponding use-case or taxonomy) without requiring the specific identity information of each deployed device. Further, machine learning tasks utilized to enhance resiliency and reliability in the system can be distributed, such that at least a portion of the tasks are handled by the deployed devices using data local to the device. This can facilitate scaling up of systems utilizing the improved management framework.

As described above and explained further throughout the following figures, cognitive and/or context-aware devices 120 may provide numerous advantageous in IoT systems, including improved performance and service delivery, intelligent resource orchestration, and/or intelligent network configuration.

In general, systems, servers, clients, computing devices, network elements, hosts, end-user devices 130, sensor/actuator devices 105, and/or any other IoT edge devices 120 or network services (e.g., cloud services 180, IoT management services 190) in example IoT system 100 may include electronic computing devices operable to receive, transmit, process, store, or manage data and information associated with the IoT system 100. As used in this document, the term "computer," "processor," "processor device," or "processing device" is intended to encompass any suitable processing apparatus. For example, elements shown as single devices within the IoT system 100 may be implemented using a plurality of computing devices and processors, such as server pools with multiple server computers. Further, any, all, or some of the computing devices may be adapted to execute any operating system, including Linux, UNIX, Microsoft Windows, Apple MacOS, Apple iOS, Google Android, Windows Server, etc., as well as virtual machines adapted to virtualize execution of a particular operating system, including customized and proprietary operating systems.

Systems, such as those shown and illustrated herein, can include machine logic implemented in hardware and/or software, and/or embodied in a computer readable medium, to implement the solutions described throughout this disclosure.

While FIG. 1 is described as containing or being associated with a plurality of elements, not all elements illustrated within communications system 100 of FIG. 1 may be utilized in each alternative implementation of the present disclosure. Additionally, one or more of the elements described in connection with the examples of FIG. 1 may be located external to communications system 100, while in other instances, certain elements may be included within or as a portion of one or more of the other described elements, as well as other elements not depicted in the illustrated implementation. Further, certain elements illustrated in FIG. 1 may be combined with other components, as well as used for alternative or additional purposes in addition to those purposes described herein.

Figure 2:
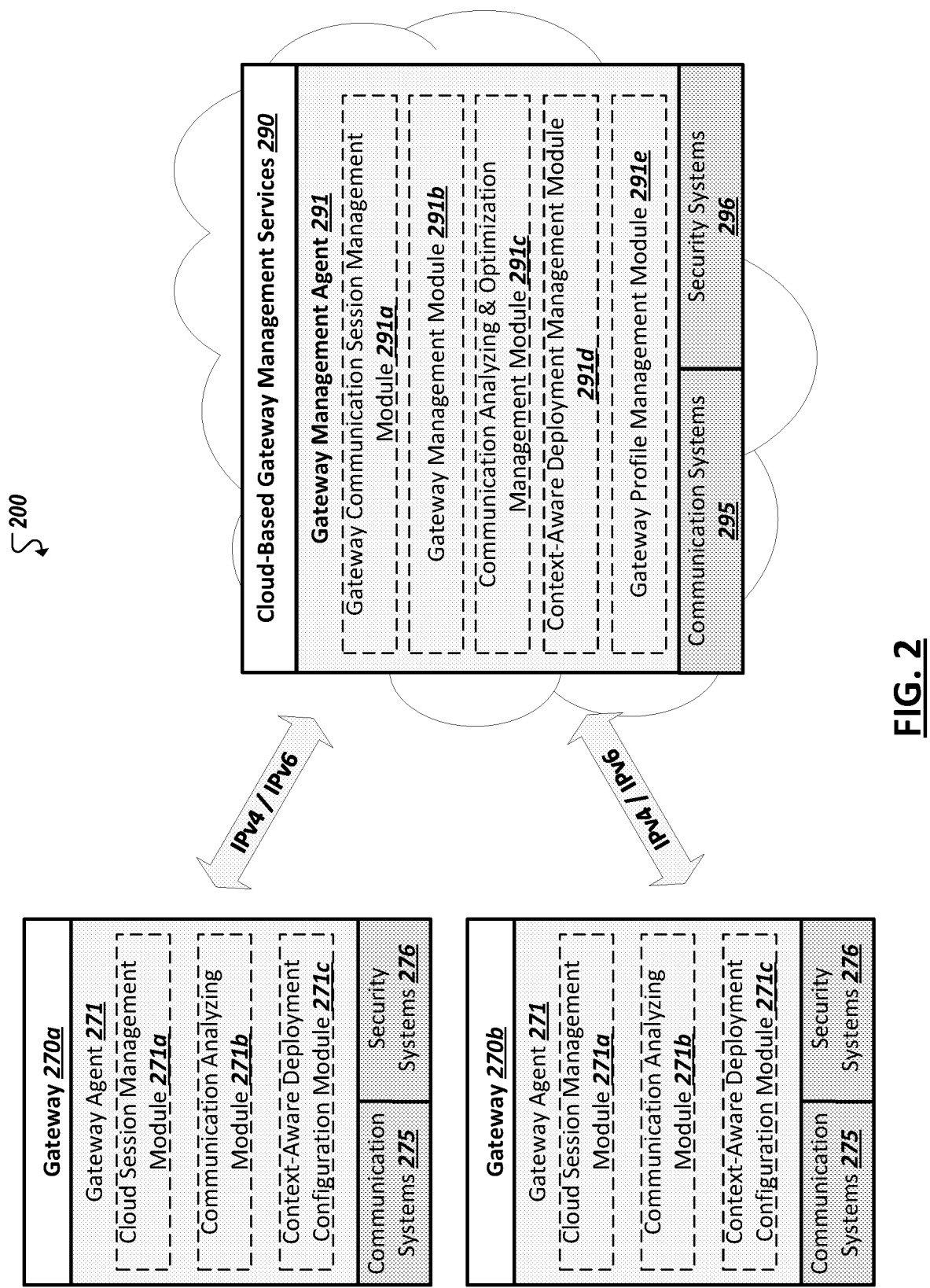
FIG. 2 illustrates an example embodiment of a gateway management system.

FIG. 2 illustrates an example embodiment of a gateway management system 200 for providing intelligent gateway configuration and deployment. In the illustrated embodiment, gateway management system 200 includes gateways 270*a-b* and cloud-based gateway management services 290. In some embodiments, gateways 270 may be similar to gateways 170 of FIG. 1. In addition, in some embodiments, gateways 270 may be cognitive context-aware devices, similar to cognitive edge devices 120 of FIG. 1. Finally, in some embodiments, cloud-based gateway management services 290 may be similar to IoT management services 190 of FIG. 1.

IoT applications vary significantly, from smart grid infrastructures to smart agriculture, healthcare, and mining. IoT gateways 270 deployed in each of these use cases require deployment specific context information to perform optimally. Intelligent context-aware IoT gateways 270 may be leveraged, in some embodiments, to provide intelligent and autonomous IoT configuration and deployment.

Intelligent gateways 270 may detect and leverage contextual information about their operating environment based on information from sensors (e.g., sensors 110 of FIG. 1), other IoT devices (e.g., sensor/actuator devices, end-user computing devices, and other gateways), cloud services, and/or other network resources. Gateways 270 may utilize context information from a gateway's own sensors and/or from sensors of other IoT devices. In some embodiments, sensors may be internal sensors or external sensors. Internal sensors, for example, may be configured to sense or monitor contextual information regarding a device's own internal operating environment, such as processor usage, device workload, memory capacity, battery capacity, network usage, internal temperature (e.g., heating of processors), software security alerts, software errors and exceptions, among other attributes and events. External sensors, for example, may be configured to detect, measure, and generate sensor data describing characteristics and contextual information of the device's external operating environment where it resides. For instance, a given sensor may be configured to detect contextual information of a device, such as movement, weight, physical contact, temperature, wind, noise, light, computer communications, wireless signals, location, humidity, the presence of radiation, liquid, or specific chemical compounds, among several other examples. Indeed, device sensors as described herein contemplate a potentially limitless universe of various sensors, each designed to detect and generate corresponding sensor data for new and unknown operating environment characteristics.

Deployment, configuration, and management of IoT systems may be significantly improved, in some embodiments, through context-aware gateways 270 that facilitate autonomous network configuration and management, which significantly reduces the human interaction and labor required in complex and evolving IoT systems. For instance, IoT systems can adopt a paradigm where, instead of being programmed and/or configured to operate with specific IoT devices and/or cloud services in static environments and/or use-cases, the system can leverage contextual information about the operating environment of the IoT devices (e.g., gateways 270) to autonomously configure and deploy (and re-deploy) devices in an IoT system, and intelligently manage the IoT system with minimal human intervention. For example, context-aware gateways 270 may configure themselves autonomously based on their use-cases and context information about their operating environment, updating that configuration autonomously as their operating environment and/or use-cases change. In some cases, the use-case for a particular IoT gateway 270 may be determined automatically based on the gateway's contextual information.

For example, a smart office gateway may require different configurations based on characteristics of the building it is deployed in, such as the number of floors, the size of the floor it is deployed on, the number of other gateways in the office, the location of those gateways and their proximity to each other, etc. The transmission power of the gateway, for example, may be varied based on the size of the floor and the number of other gateways in the proximity.

As another example, a gateway used for tracking cargo could be attached to a shipping container that contains multiple palettes of boxes, where each box has a tracking sensor. The communications medium used by the gateway to communicate with the cloud, along with its reporting frequency, may differ depending on whether the shipping container is in the warehouse or on a delivery truck (e.g., Wi-Fi versus cellular), the number of boxes in the container, and so forth.

As another example, a gateway deployed in a smart home use case may need to react differently to an environmental change (e.g., temperature change) than if it were deployed in a smart city use-case. The location of the device, along with other contextual information, can be used to identify the environment and use-case of the device and configure it accordingly.

As another example, a gateway deployed in a smart office environment capable of measuring the office temperature could be redeployed outdoors to detect forest fires. Such re-deployment would require the gateway to react differently to temperature changes, change the frequency and communications methods used for its reporting, etc.

Intelligent gateway management system 200 scales and configures IoT gateways 270 based on these varying deployment contexts and use-cases.

Existing IoT gateway management solutions require manual human configuration and must be manually updated as gateways transition into new deployment scenarios. The intelligent gateway management system 200 described throughout this disclosure may be used to dynamically configure and/or manage IoT gateways 270 with context-aware optimization according to varying deployment scenarios that may be subject to behavioral changes. Intelligent gateway management system 200 provides a cost-effective, quick time-to-market, and dynamic solution that reduces time-consuming and error-prone manual configuration procedures, increases performance and operational savings, and opens the door for market expansion of IoT systems.

Intelligent gateway management system 200 may be implemented, in some embodiments, using configuration agents both in the cloud and on the gateways themselves. For example, intelligent gateway management system 200 may include cloud-based gateway management services 290, and gateway agents 271 in each gateway 270. Cloud-based gateway management services 290 may use gateway management agent 291 to manage gateways in a distributed approach using deployment specific context information for optimal settings and operation. For ease of reference, cloud-based gateway management agent 291 may be referred to throughout this disclosure as "cloud agent 291."

Cloud agent 291 includes various modules that facilitate intelligent gateway management functionality, including gateway communication session management module 291a, gateway management module 291b, communication analyzing and optimization management module 291c, context-aware deployment management module 291d, and gateway profile management module 291e.

Gateway communication session management module 291a is the core component for communications between the gateway management service provider 290 and the IoT gateways 270. Communication module 291a manages the communications channel between the cloud agent 291 and the gateways 270, providing synchronous and asynchronous session management and tracking services. This component provides a mechanism for the gateway agents 271 to exchange information with the cloud agent 291, such as contextual deployment information, gateway configuration profiles, and status updates, among other examples. This module 291a may utilize any type of communications protocol, including TCP/IP, Wi-Fi, cellular, and/or any other wired or wireless communications protocol.

Gateway management module 291b uses standard protocols to exchange management-related messages and commands between cloud services 290 and gateways 270, for example, over sensor or cellular networks. In some embodiments, gateway management module 291b may use a protocol such as the Open Mobile Alliance Lightweight Machine-to-Machine (OMA LWM2M) protocol, although any communications protocol may alternatively be used.

Communication analyzing and optimization management module 291c analyzes information regarding the gateway's communications patterns, such as network traffic patterns. For example, gateway 270 may monitor its overall communications and may provide information regarding those communications to cloud agent 291. Communication analyzing module 291c of cloud agent 291 then performs further analysis to identify the gateway's communications patterns, allowing those communication patterns to be understood and leveraged for optimal autonomous deployment. For example, in some embodiments, machine learning techniques may be used to identify and derive meaning from the communications patterns, allowing models to be developed based on this learning, which can then be used to prescribe a particular action and/or configuration for IoT gateways under circumstances, as dictated by the models.

Context-aware deployment management module 291d processes the information collected by the analyzing and optimization management module, along with any other context-based information regarding the gateway's operating environment, as discussed throughout this disclosure. Context-aware module 291d creates the context-aware configurations and settings for the distributed gateway management system. In addition, gateway settings and configurations are collected and categorized for different types of use-case deployments to help derive the patterns of communications, as discussed above. The model created from the communication pattern is used for configuration and management of IoT gateways.

Gateway profile management module 291e processes the information from the other modules 291a-d and creates gateway profiles according to the universe of information, such as the category of deployment, deployment-specific context information, and communication patterns, among other information. These profiles facilitate optimal configuration and management of the IoT gateways 270. In addition, gateway profile module 291 enables gateway configurations to be automatically switched based on changes in the deployment context, operating environment, and so forth (e.g., if the gateway is moved from a shipping warehouse to a delivery truck).

As noted above, each gateway 270 includes an intelligent gateway agent 271 to coordinate with the cloud-based gateway management services 290. Gateway agents 271 monitor and execute context-aware management services for the gateway 270 by communicating with the cloud-based gateway management services 290. The context-aware information consists of specific deployment information and parameters for various application use-cases and environments, as discussed throughout this disclosure.

Intelligent gateway agent 271 includes various modules that facilitate intelligent gateway management functionality, and facilitate coordination with cloud gateway management services 290. These modules include cloud session management module 271a, communication analyzing module 271b, and context-aware deployment configurations module 271c.

Cloud session management module 271a maintains a communication session with the IoT gateway management service provider 290. This module provides a mechanism for the gateway agents 271 to exchange information with the cloud agent 291, such as contextual deployment information, gateway configuration profiles, and status updates, among other information. For example, in some embodiments, this module provides a communication link used by the other modules 271b,c of gateway agent 271 to communicate with the cloud-based gateway management services 290. In some embodiments, this module may be the counterpart to the gateway communication session management module 291a of cloud agent 291.

Communication analyzing module 271b monitors the overall communication of gateway 270 and performs local analysis to identify communications patterns, such as traffic patterns. In addition, this module provides a filtered version of its analysis to the cloud-based gateway management service 290 for further cloud-based processing and analysis. In some embodiments, this module may be the counterpart to the communication analyzing and optimization management module 291c of cloud agent 291.

Context-aware deployment configurations module 271c collects contextual operating parameters to assist with autonomous context-aware configurations. Contextual information collected by this module may include, for example, mobility, network size, traffic patterns, among many other examples discussed throughout this disclosure. Moreover, as described throughout this disclosure, different IoT use-cases and deployment environments require tailored configuration parameters for optimal performance. This module provides the collected contextual information to the cloud services provider 290, and subsequently retrieves the context-aware configuration generated by the cloud services provider 290. In some embodiments, this module may be the counterpart to the context-aware deployment management module 291d of cloud agent 291.

Figure 3A:
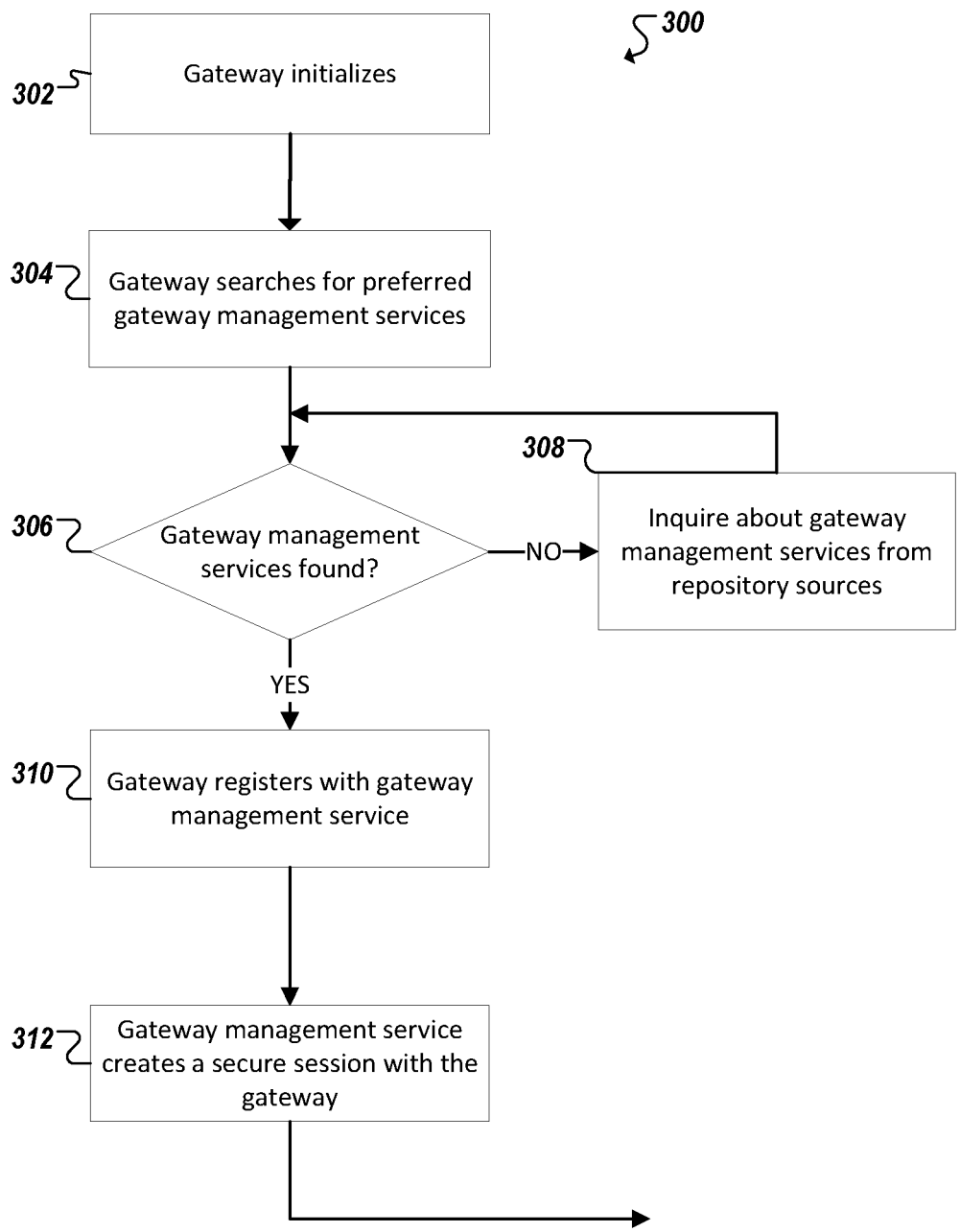
FIGS. 3A, 3B, and 3C illustrate a flowchart for an example embodiment of a gateway management system.
Figure 3B:
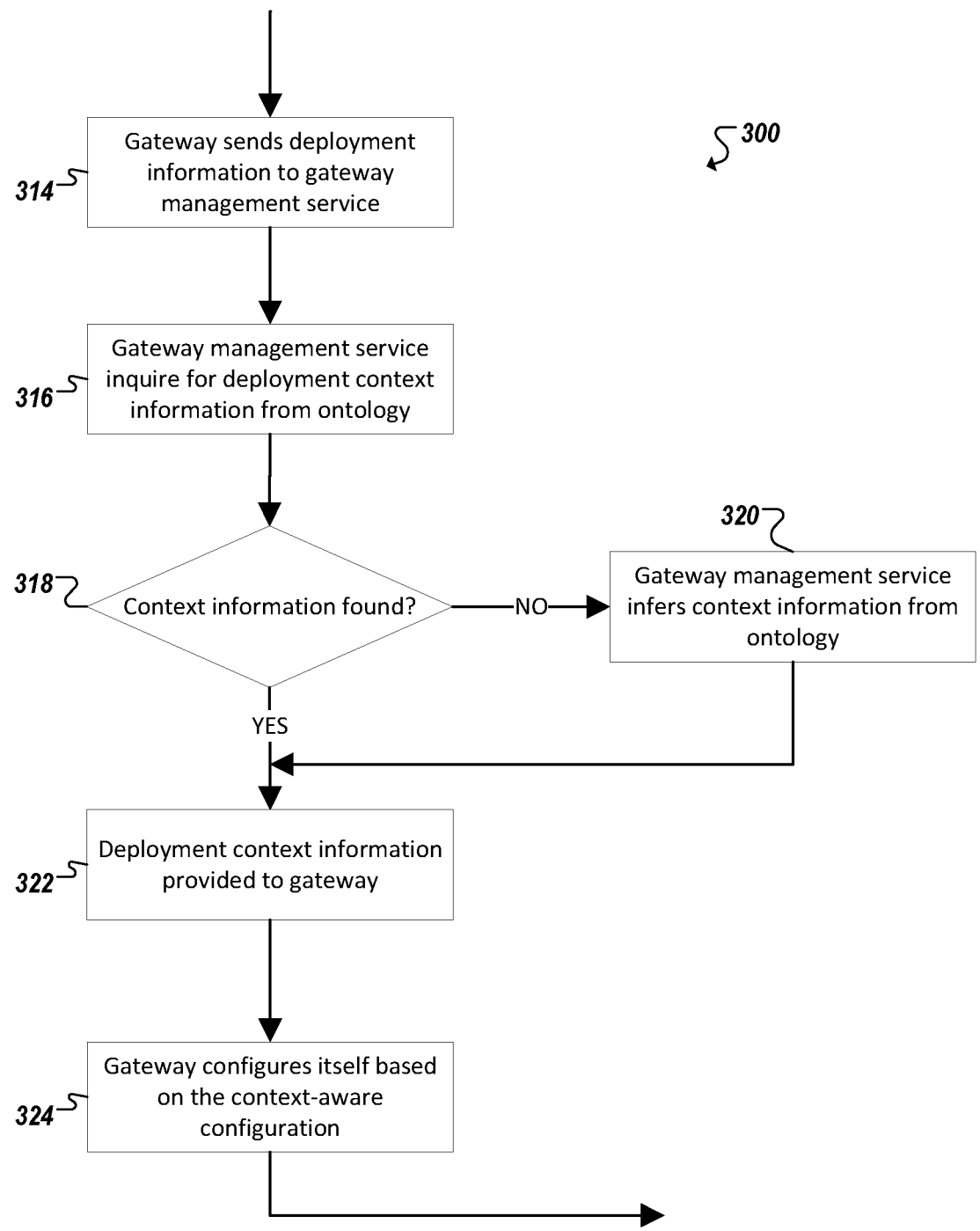
Figure 3C:
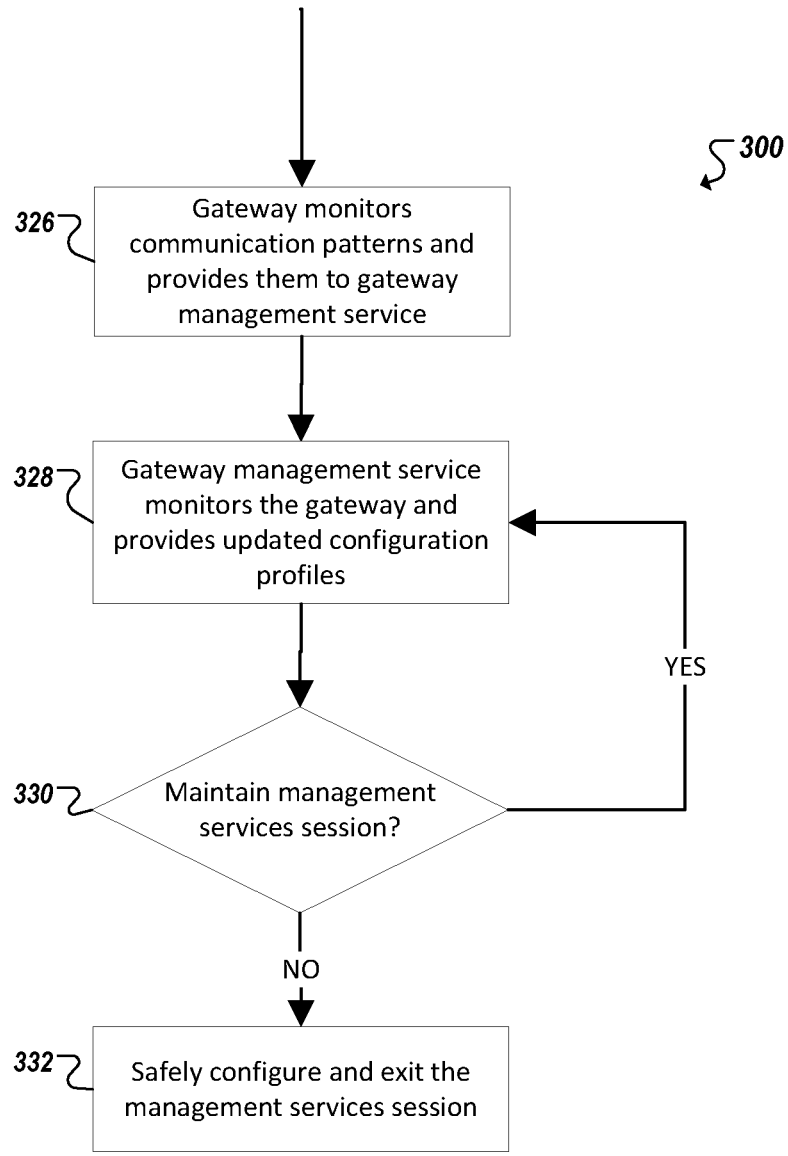

FIGS. 3A, 3B, and 3C illustrate a flowchart 300 for an example embodiment of an intelligent gateway management system. Flowchart 300 may be implemented, for example, by the components described throughout this disclosure in connection with the other FIGURES. There are four stages in the process illustrated by flowchart 300: initialization (FIG. 3A), inquiry and configuration (FIG. 3B), service analyzing and management (FIG. 3C), and the exiting stage (FIG. 3C).

The flowchart may begin at block 302, where the gateway initializes. The flowchart then proceeds to block 304, where the gateway searches for preferred gateway management services. The flowchart then proceeds to block 306, where it is determined whether any gateway management services were found. If no gateway management services were found, then the flowchart proceeds to block 308, where the gateway inquires about gateway management services from repository sources. The flowchart then returns to block 306 to determine if any gateway management services were found.

If it is determined at block 306 that gateway management services were found, the flowchart then proceeds to block 310, where the gateway registers with the gateway management service. The flowchart then proceeds to block 312, where the gateway management service creates a secure session with the gateway. The flowchart then proceeds to block 314, where the gateway sends deployment information to the gateway management service. The flowchart then proceeds to block 316, where the gateway management service inquires for deployment context information from the ontology. The flowchart then proceeds to block 318, where it is determined whether any context information was found. If it is determined at block 318 that context information was found, the flowchart then proceeds to block 322, discussed below. If it is determined at block 318 that no context information was found, the flowchart then proceeds to block 320, where the gateway management service infers context information from the ontology. The flowchart then proceeds to block 322.

At block 322, deployment context information is provided to the gateway by the gateway management service. The flowchart then proceeds to block 324, where the gateway configures itself based on the context-aware configuration. The flowchart then proceeds to block 326, where the gateway monitors communication patterns and provides them to the gateway management service. The flowchart then proceeds to block 328, where the gateway management service monitors the gateway and provides updated configuration profiles to the gateway, for example, based on changes in the deployment environment. The flowchart then proceeds to block 330, where it is determined whether to continue maintaining the management services session between the gateway and the gateway management service. For example, the management services session may be continuously or periodically maintained to adapt to changes in the gateway's deployment environment, or it may be terminated after the gateway is successfully configured. If it is determined at block 330 that the management services session should be maintained, then the flowchart proceeds back to block 328, where the gateway management service monitors the gateway and provides updated configuration profiles, as described above. If it is determined at block 330 that the management services session should not be maintained, then the flowchart proceeds to block 332, where the gateway is safely configured and the management services session is terminated. At this point, the flowchart is complete. In some embodiments, however, the flowchart may restart and/or certain steps may be repeated.

Figure 4:
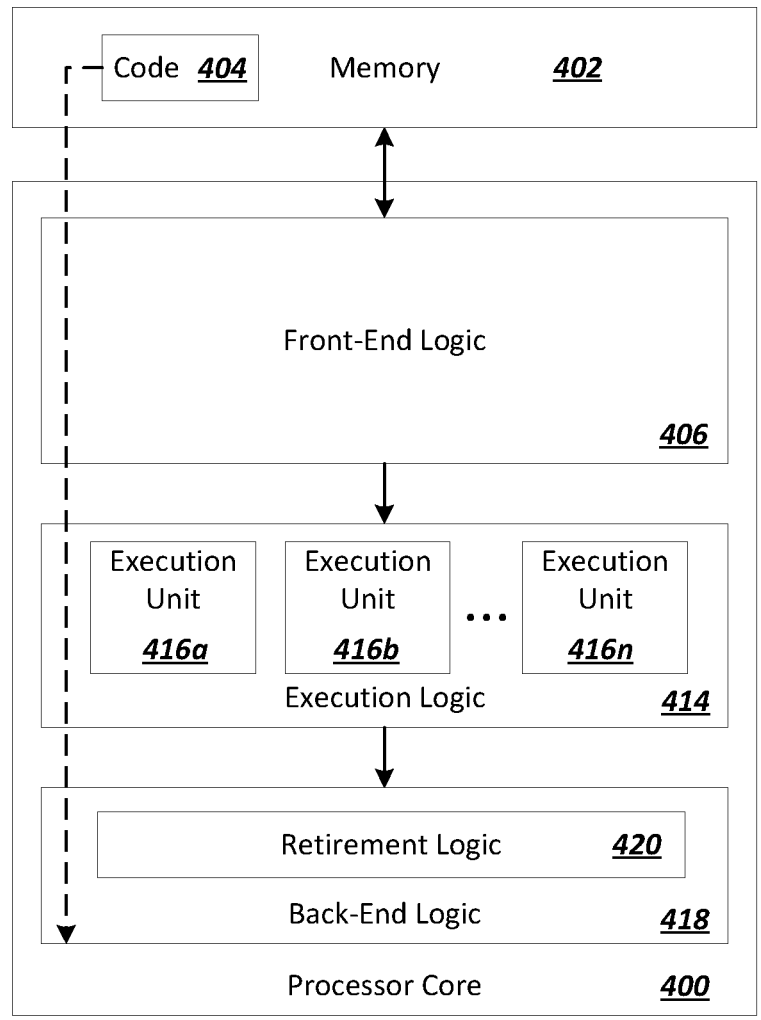
FIG. 4 illustrates a block diagram for an example embodiment of a processor.
Figure 5:
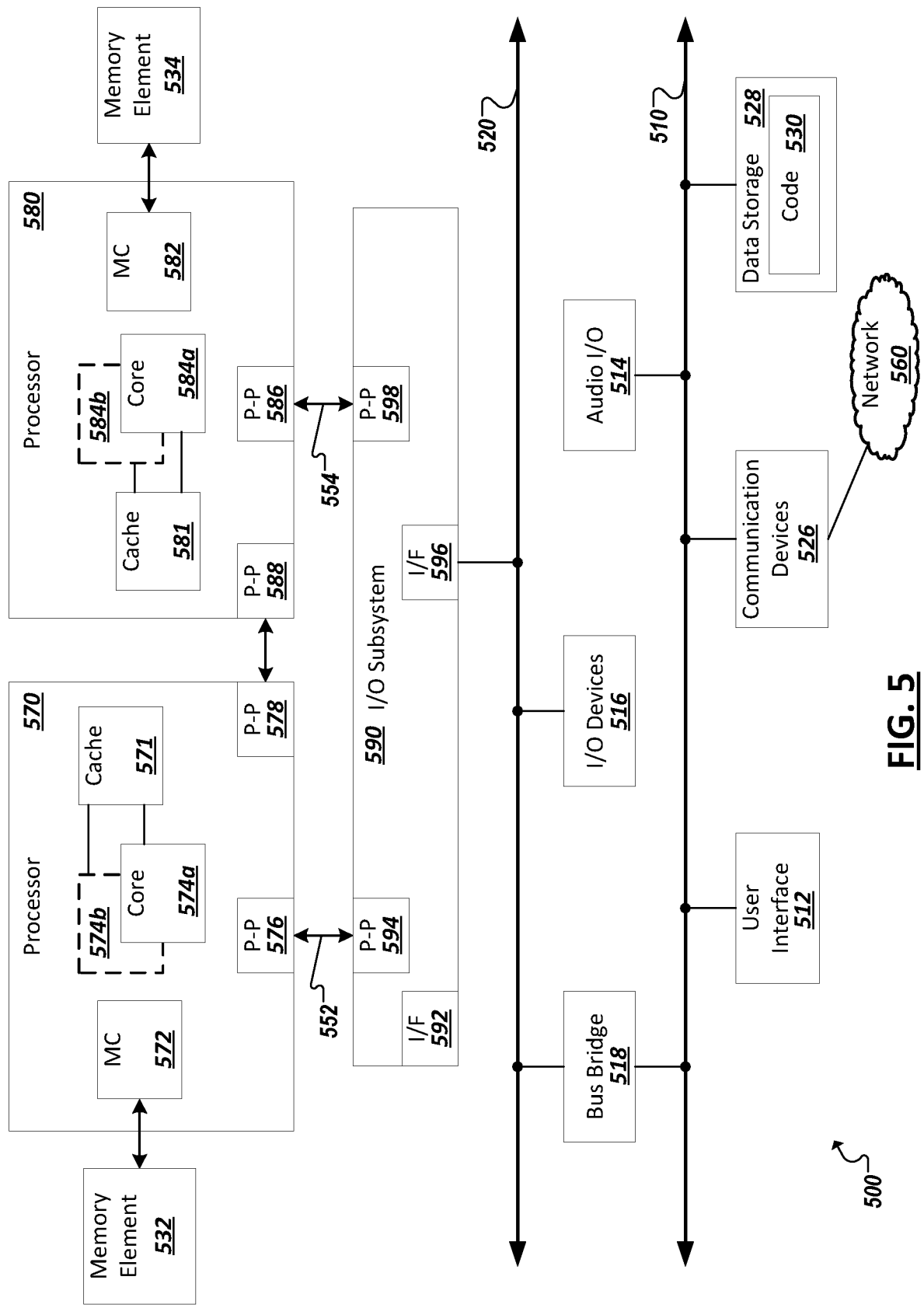
FIG. 5 illustrates a block diagram for an example embodiment of a computing system.

FIGS. 4-5 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 4-5.

FIG. 4 illustrates a block diagram for an example embodiment of a processor 400. Processor 400 is an example of a type of hardware device that can be used in connection with the implementations above. Processor 400 may be any type of processor, such as a microprocessor, an embedded processor, a digital signal processor (DSP), a network processor, a multi-core processor, a single core processor, or other device to execute code. Although only one processor 400 is illustrated in FIG. 4, a processing element may alternatively include more than one of processor 400 illustrated in FIG. 4. Processor 400 may be a single-threaded core or, for at least one embodiment, the processor 400 may be multi-threaded in that it may include more than one hardware thread context (or "logical processor") per core.

FIG. 4 also illustrates a memory 402 coupled to processor 400 in accordance with an embodiment. Memory 402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 400 can execute any type of instructions associated with algorithms, processes, or operations detailed herein. Generally, processor 400 can transform an element or an article (e.g., data) from one state or thing to another state or thing.

Code 404, which may be one or more instructions to be executed by processor 400, may be stored in memory 402, or may be stored in software, hardware, firmware, or any suitable combination thereof, or in any other internal or external component, device, element, or object where appropriate and based on particular needs. In one example, processor 400 can follow a program sequence of instructions indicated by code 404. Each instruction enters a front-end logic 406 and is processed by one or more decoders 408. The decoder may generate, as its output, a micro operation such as a fixed width micro operation in a predefined format, or may generate other instructions, microinstructions, or control signals that reflect the original code instruction. Front-end logic 406 may also include register renaming logic and scheduling logic, which generally allocate resources and queue the operation corresponding to the instruction for execution.

Processor 400 can also include execution logic 414 having a set of execution units 416a, 416b, 416n, etc. Some embodiments may include a number of execution units dedicated to specific functions or sets of functions. Other embodiments may include only one execution unit or one execution unit that can perform a particular function. Execution logic 414 performs the operations specified by code instructions.

After completion of execution of the operations specified by the code instructions, back-end logic 418 can retire the instructions of code 404. In one embodiment, processor 400 allows out of order execution but requires in order retirement of instructions. Retirement logic 420 may take a variety of known forms (e.g., re-order buffers or the like). In this manner, processor 400 is transformed during execution of code 404, at least in terms of the output generated by the decoder, hardware registers and tables utilized by register renaming logic 410, and any registers (not shown) modified by execution logic 414.

Although not shown in FIG. 4, a processing element may include other elements on a chip with processor 400. For example, a processing element may include memory control logic along with processor 400. The processing element may include I/O control logic and/or may include I/O control logic integrated with memory control logic. The processing element may also include one or more caches. In some embodiments, non-volatile memory (such as flash memory or fuses) may also be included on the chip with processor 400.

FIG. 5 illustrates a block diagram for an example embodiment of a computing system 500. Computing system 500 is arranged in a point-to-point (PtP) configuration according to an embodiment. In particular, FIG. 5 shows a system where processors, memory, and input/output devices are interconnected by a number of point-to-point interfaces. Generally, one or more of the computing systems described herein may be configured in the same or similar manner as computing system 500.

Processors 570 and 580 may also each include integrated memory controller logic (MC) 572 and 582 to communicate with memory elements 532 and 534. In alternative embodiments, memory controller logic 572 and 582 may be discrete logic separate from processors 570 and 580. Memory elements 532 and/or 534 may store various data to be used by processors 570 and 580 in achieving operations and functionality outlined herein.

Processors 570 and 580 may be any type of processor, such as those discussed in connection with other figures. Processors 570 and 580 may exchange data via a point-to-point (PtP) interface 550 using point-to-point interface circuits 578 and 588, respectively. Processors 570 and 580 may each exchange data with a chipset 590 via individual point-to-point interfaces 552 and 554 using point-to-point interface circuits 576, 586, 594, and 598. Chipset 590 may also exchange data with a high-performance graphics circuit 538 via a high-performance graphics interface 539, using an interface circuit 592, which could be a PtP interface circuit. In alternative embodiments, any or all of the PtP links illustrated in FIG. 5 could be implemented as a multi-drop bus rather than a PtP link.

Chipset 590 may be in communication with a bus 520 via an interface circuit 596. Bus 520 may have one or more devices that communicate over it, such as a bus bridge 518 and I/O devices 516. Via a bus 510, bus bridge 518 may be in communication with other devices such as a user interface 512 (such as a keyboard, mouse, touchscreen, or other input devices), communication devices 526 (such as modems, network interface devices, or other types of communication devices that may communicate through a computer network 560), audio I/O devices 514, and/or a data storage device 528. Data storage device 528 may store code 530, which may be executed by processors 570 and/or 580. In alternative embodiments, any portions of the bus architectures could be implemented with one or more PtP links.

The computer system depicted in FIG. 5 is a schematic illustration of an embodiment of a computing system that may be utilized to implement various embodiments discussed herein. It will be appreciated that various components of the system depicted in FIG. 5 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples.

Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification.

One or more embodiments may provide at least one machine accessible storage medium having instructions stored thereon, the instructions when executed on a machine, cause the machine to: detect deployment context information for an edge gateway, wherein the deployment context information identifies a deployment environment of the edge gateway based on information from one or more sensors; transmit, via a communications network, the deployment context information for the edge gateway to a gateway management node; receive, via the communications network, a gateway configuration for the edge gateway from the gateway management node; and configure the edge gateway based on the gateway configuration.

In one example, the instructions further cause the machine to: detect updated deployment context information for the edge gateway, wherein the updated deployment context information identifies an updated deployment environment of the edge gateway based on information from the one or more sensors; transmit, via the communications network, the updated deployment context information for the edge gateway to the gateway management node; receive, via the communications network, an updated gateway configuration for the edge gateway from the gateway management node; and configure the edge gateway based on the updated gateway configuration.

In one example, the deployment context information comprises a location of the edge gateway.

In one example, the deployment context information comprises mobility information for the edge gateway.

In one example, the deployment context information comprises network traffic patterns for the edge gateway.

In one example, the deployment context information comprises network size information.

In one example, the deployment context information comprises information regarding other edge gateways in the communications network.

In one example, the deployment context information comprises a use case for the edge gateway.

One or more embodiments may provide an apparatus comprising a processor, wherein the processor is configured to: detect deployment context information for an edge gateway, wherein the deployment context information identifies a deployment environment of the edge gateway based on information from one or more sensors; transmit, via a communications network, the deployment context information for the edge gateway to a gateway management node; receive, via the communications network, a gateway configuration for the edge gateway from the gateway management node; and configure the edge gateway based on the gateway configuration.

In one example, the processor is further configured to: detect updated deployment context information for the edge gateway, wherein the updated deployment context information identifies an updated deployment environment of the edge gateway based on information from the one or more sensors; transmit, via the communications network, the updated deployment context information for the edge gateway to the gateway management node; receive, via the communications network, an updated gateway configuration for the edge gateway from the gateway management node; and configure the edge gateway based on the updated gateway configuration.

In one example, the deployment context information comprises a location of the edge gateway.

In one example, the deployment context information comprises mobility information for the edge gateway.

In one example, the deployment context information comprises network traffic patterns for the edge gateway.

In one example, the deployment context information comprises network size information.

In one example, the deployment context information comprises information regarding other edge gateways in the communications network.

In one example, the deployment context information comprises a use case for the edge gateway.

In one example, the processor is further configured to allocate resources to the edge gateway by interconnecting the edge gateway with one or more additional edge devices such that the edge gateway comprises multiple interconnected edge devices.

One or more embodiments may provide a method, comprising: detecting deployment context information for an edge gateway, wherein the deployment context information identifies a deployment environment of the edge gateway based on information from one or more sensors; transmitting, via a communications network, the deployment context information for the edge gateway to a gateway management node; receiving, via the communications network, a gateway configuration for the edge gateway from the gateway management node; and configuring the edge gateway based on the gateway configuration.

In one example, the method further comprises: detecting updated deployment context information for the edge gateway, wherein the updated deployment context information identifies an updated deployment environment of the edge gateway based on information from the one or more sensors; transmitting, via the communications network, the updated deployment context information for the edge gateway to the gateway management node; receiving, via the communications network, an updated gateway configuration for the edge gateway from the gateway management node; and configuring the edge gateway based on the updated gateway configuration.

One or more embodiments may provide a system, comprising: a processor; a memory; logic, when executed by the processor, configured to: detect deployment context information for an edge gateway, wherein the deployment context information identifies a deployment environment of the edge gateway based on information from one or more sensors; transmit, via a communications network, the deployment context information for the edge gateway to a gateway management node; receive, via the communications network, a gateway configuration for the edge gateway from the gateway management node; and configure the edge gateway based on the gateway configuration.

In one example, the logic is further configured to: detect updated deployment context information for the edge gateway, wherein the updated deployment context information identifies an updated deployment environment of the edge gateway based on information from the one or more sensors; transmit, via the communications network, the updated deployment context information for the edge gateway to the gateway management node; receive, via the communications network, an updated gateway configuration for the edge gateway from the gateway management node; and configure the edge gateway based on the updated gateway configuration.

One or more embodiments may provide at least one machine accessible storage medium having instructions stored thereon, the instructions when executed on a machine, cause the machine to: receive, via a communications network, deployment context information for an edge gateway, wherein the deployment context information identifies a deployment environment of the edge gateway based on information from one or more sensors; determine a gateway configuration for the edge gateway based on the deployment context information for the edge gateway; and transmit, via the communications network, the gateway configuration to the edge gateway.

In one example, the instructions further cause the machine to: receive, via the communications network, updated deployment context information for the edge gateway, wherein the updated deployment context information identifies an updated deployment environment of the edge gateway based on information from the one or more sensors; determine an updated gateway configuration for the edge gateway based on the updated deployment context information for the edge gateway; and transmit, via the communications network, the updated gateway configuration to the edge gateway.

In one example, the instructions that cause the machine to determine the gateway configuration for the edge gateway based on the deployment context information for the edge gateway further cause the machine to determine the gateway configuration for the edge gateway based on deployment context information for one or more additional edge gateways.

One or more embodiments may provide a system, comprising: a processor; a memory; logic, when executed by the processor, configured to: receive, via a communications network, deployment context information for an edge gateway, wherein the deployment context information identifies a deployment environment of the edge gateway based on information from one or more sensors; determine a gateway configuration for the edge gateway based on the deployment context information for the edge gateway; and transmit, via the communications network, the gateway configuration to the edge gateway.

In one example, the logic is further configured to: receive, via the communications network, updated deployment context information for the edge gateway, wherein the updated deployment context information identifies an updated deployment environment of the edge gateway based on information from the one or more sensors; determine an updated gateway configuration for the edge gateway based on the updated deployment context information for the edge gateway; and transmit, via the communications network, the updated gateway configuration to the edge gateway.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one non-transitory machine accessible storage medium having instructions stored thereon, the instructions when executed on a machine, cause the machine to:
   detect deployment context information for an edge gateway, wherein the deployment context information comprises an indication of:
      a location of the edge gateway;
      a physical environment in which the edge gateway is deployed based on information from one or more sensors;
      network resource availability; and
      a use case for the edge gateway;
   transmit, via a communications network, the deployment context information for the edge gateway to a gateway management node;
   receive, via the communications network, a gateway configuration for the edge gateway from the gateway management node, wherein the gateway configuration is based on the deployment context information for the edge gateway; and
   configure the edge gateway based on the gateway configuration.

2. The storage medium of claim 1, wherein the instructions further cause the machine to:
   detect updated deployment context information for the edge gateway, wherein the updated deployment context information identifies an updated deployment environment of the edge gateway based on information from the one or more sensors;
   transmit, via the communications network, the updated deployment context information for the edge gateway to the gateway management node;

receive, via the communications network, an updated gateway configuration for the edge gateway from the gateway management node; and
configure the edge gateway based on the updated gateway configuration.

3. The storage medium of claim 1, wherein the deployment context information further comprises mobility information indicating a mobility of the edge gateway.

4. The storage medium of claim 1, wherein the deployment context information further comprises network traffic patterns for the edge gateway.

5. The storage medium of claim 1, wherein the network resource availability comprises information regarding other edge gateways in the communications network.

6. The storage medium of claim 1, wherein the deployment context information further comprises network size information.

7. An apparatus comprising a processor, wherein the processor is configured to:
detect deployment context information for an edge gateway, wherein the deployment context information comprises an indication of:
a location of the edge gateway;
a physical environment in which the edge gateway is deployed based on information from one or more sensors;
network resource availability; and
a use case for the edge gateway;
transmit, via a communications network, the deployment context information for the edge gateway to a gateway management node;
receive, via the communications network, a gateway configuration for the edge gateway from the gateway management node, wherein the gateway configuration is based on the deployment context information for the edge gateway; and
configure the edge gateway based on the gateway configuration.

8. The apparatus of claim 7, wherein the processor is further configured to:
detect updated deployment context information for the edge gateway, wherein the updated deployment context information identifies an updated deployment environment of the edge gateway based on information from the one or more sensors;
transmit, via the communications network, the updated deployment context information for the edge gateway to the gateway management node;
receive, via the communications network, an updated gateway configuration for the edge gateway from the gateway management node; and
configure the edge gateway based on the updated gateway configuration.

9. The apparatus of claim 7, wherein the deployment context information further comprises mobility information indicating a mobility of the edge gateway.

10. The apparatus of claim 7, wherein the deployment context information further comprises network traffic patterns for the edge gateway.

11. The apparatus of claim 7, wherein the deployment context information further comprises network size information.

12. The apparatus of claim 7, wherein the processor is further configured to allocate resources to the edge gateway by interconnecting the edge gateway with one or more additional edge devices such that the edge gateway comprises multiple interconnected edge devices.

13. A method, comprising:
detecting deployment context information for an edge gateway, wherein the deployment context information comprises an indication of:
a location of the edge gateway;
a physical environment in which the edge gateway is deployed based on information from one or more sensors;
network resource availability; and
a use case for the edge gateway;
transmitting, via a communications network, the deployment context information for the edge gateway to a gateway management node;
receiving, via the communications network, a gateway configuration for the edge gateway from the gateway management node, wherein the gateway configuration is based on the deployment context information for the edge gateway; and
configuring the edge gateway based on the gateway configuration.

14. The method of claim 13, further comprising:
detecting updated deployment context information for the edge gateway, wherein the updated deployment context information identifies an updated deployment environment of the edge gateway based on information from the one or more sensors;
transmitting, via the communications network, the updated deployment context information for the edge gateway to the gateway management node;
receiving, via the communications network, an updated gateway configuration for the edge gateway from the gateway management node; and
configuring the edge gateway based on the updated gateway configuration.

15. At least one non-transitory machine accessible storage medium having instructions stored thereon, the instructions when executed on a machine, cause the machine to:
receive, via a communications network, deployment context information for an edge gateway, wherein the deployment context information comprises an indication of:
a location of the edge gateway;
a physical environment in which the edge gateway is deployed based on information from one or more sensors;
network resource availability; and
a use case for the edge gateway;
determine a gateway configuration for the edge gateway based on the deployment context information for the edge gateway; and
transmit, via the communications network, the gateway configuration to the edge gateway.

16. The storage medium of claim 15, wherein the instructions further cause the machine to:
receive, via the communications network, updated deployment context information for the edge gateway, wherein the updated deployment context information identifies an updated deployment environment of the edge gateway based on information from the one or more sensors;
determine an updated gateway configuration for the edge gateway based on the updated deployment context information for the edge gateway; and
transmit, via the communications network, the updated gateway configuration to the edge gateway.

17. The storage medium of claim 15, wherein the instructions that cause the machine to determine the gateway configuration for the edge gateway based on the deployment context information for the edge gateway further cause the machine to determine the gateway configuration for the edge gateway based on deployment context information for one or more additional edge gateways.

18. A system, comprising:
- a processor;
- a memory;
- logic, when executed by the processor, configured to:
    - receive, via a communications network, deployment context information for an edge gateway, wherein the deployment context information comprises an indication of:
        - a location of the edge gateway;
        - a physical environment in which the edge gateway is deployed based on information from one or more sensors;
        - network resource availability; and
        - a use case for the edge gateway;
    - determine a gateway configuration for the edge gateway based on the deployment context information for the edge gateway; and
    - transmit, via the communications network, the gateway configuration to the edge gateway.

19. The system of claim 18, wherein the logic is further configured to:
- receive, via the communications network, updated deployment context information for the edge gateway, wherein the updated deployment context information identifies an updated deployment environment of the edge gateway based on information from the one or more sensors;
- determine an updated gateway configuration for the edge gateway based on the updated deployment context information for the edge gateway; and
- transmit, via the communications network, the updated gateway configuration to the edge gateway.

* * * * *